United States Patent [19]
Börjesson

[11] 3,948,041
[45] Apr. 6, 1976

[54] CHAIN CONSTRUCTION

[76] Inventor: Knut Vilhelm Börjesson, Torsbygaten 34 2tr, 123 41 Farsta, Sweden

[22] Filed: Oct. 3, 1974

[21] Appl. No.: 511,519

[52] U.S. Cl. ................................ 59/78.1; 248/49
[51] Int. Cl.² ......................................... F16G 13/00
[58] Field of Search ............ 59/8, 35, 78.1, 84, 87, 59/88, 93; 191/12 C; 248/49, 51, 52, 68 R; 299/82–84; 198/189; 74/295 C, 251 C

[56] References Cited
UNITED STATES PATENTS

| | | | |
|---|---|---|---|
| 2,864,907 | 12/1958 | Waninger | 248/49 UX |
| 3,330,105 | 7/1967 | Weber | 59/78.1 |
| 3,566,603 | 3/1971 | Chadwick | 59/78.1 |
| 3,664,619 | 5/1972 | Heidrich et al. | 59/78.1 X |
| 3,716,986 | 2/1973 | Cork et al. | 59/78.1 |
| 3,782,670 | 1/1974 | Kielma | 59/78.1 X |
| 3,848,407 | 11/1974 | Moritz | 59/78.1 |

*Primary Examiner*—C. W. Lanham
*Assistant Examiner*—Joseph A. Walkowski

[57] ABSTRACT

A construction having holder means for supporting and guiding at least one flexible energy-transferring line. The chain construction being attached at one end thereof to a connecting point and at its other end to an energy-consuming or energy-producing apparatus capable of moving in the longitudinal direction of the line. The holder means comprising line support means arranged to co-act with parallel links, adjacent ones of said links being joined together in a manner such that said links can pivot through a pre-determined angle. Each link is provided with a support surface, said surfaces being mutually arranged to so as to lie in one and the same plane when the holder means are oriented in one and the same plane. At pre-determined links there are provided support wheels, the peripheral surfaces of which wheels extend over adjacent support surfaces.

19 Claims, 17 Drawing Figures

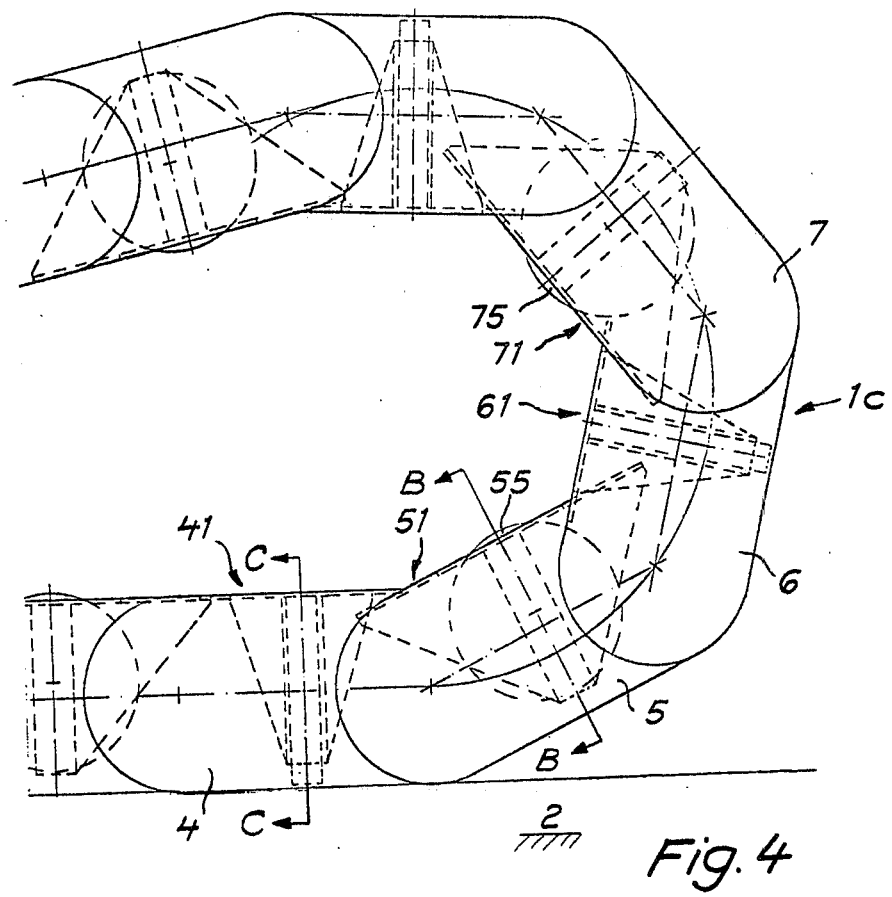
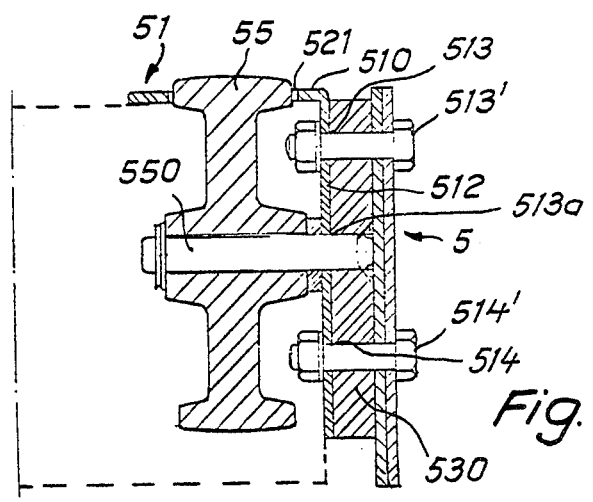

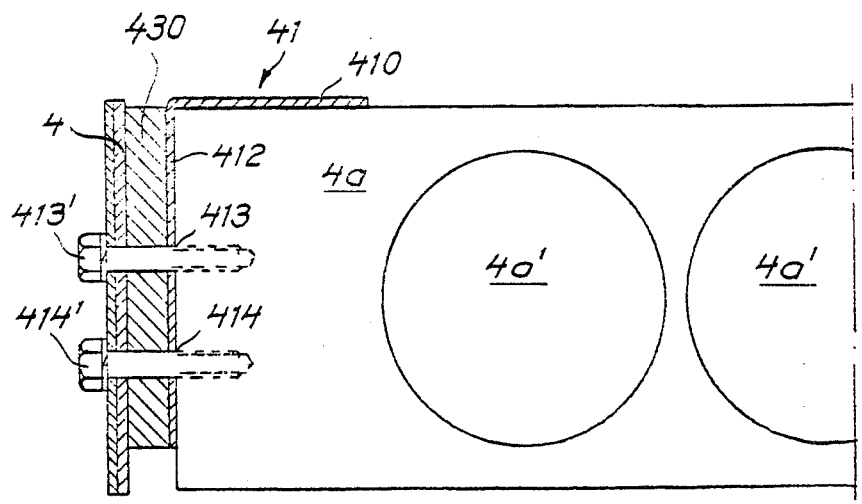
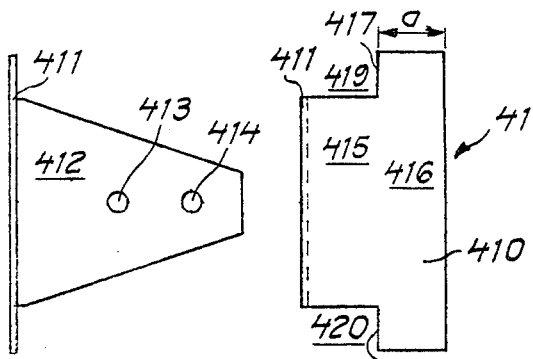
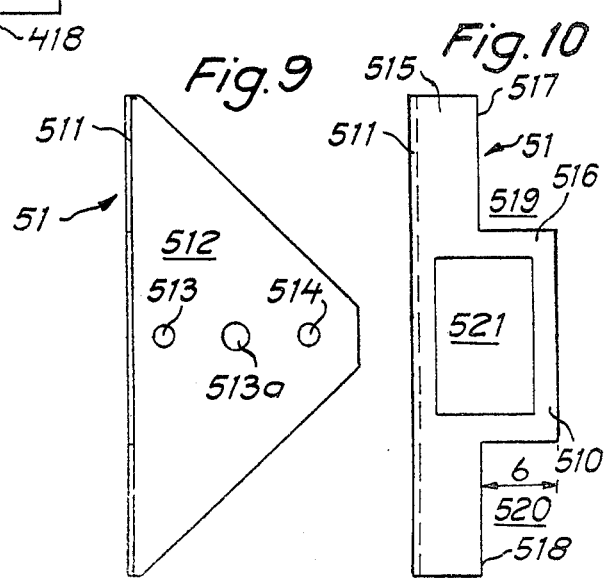

CHAIN CONSTRUCTION

FIELD OF THE PRESENT INVENTION.

The present invention relates to means for use with chain constructions having holder means which are intended to support and to guide one or more flexible, energy-transferring lines. These energy-transferring lines may have the form of flexible cables, flexible hoses or similar lines with which the transport of energy is effected from a stationary connecting point to a consumer station which is movable in the longitudinal direction of the line, or vice versa. The invention is based on the concept that one portion of the line or lines is attached to a connecting point while another part of said line or lines is attached to an energy-consuming or an energy-producing apparatus capable of being moved in the longitudinal direction of said line or lines. The aforementioned holding means may comprise line supporting means arranged to co-act with pairs of parallel-arranged links forming a chain, in which chain adjacent links are connected together for pivotable restricted movement through a pre-determined angle.

BRIEF DESCRIPTION OF THE PRIOR ART.

Holding means and chain constructions for supporting and guiding flexible cables, hoses and the like in accordance with the aforegoing are known to the art. These known constructions comprise two supporting means which are arranged in spaced apart relationship parallel with one another and which are arranged to co-act with parallel links inter-connected together for restricted pivotable movement, pivoting of said links being effected within a pre-determined angle. With one such known chain construction provided with links, said links comprise two plates of equal length which are rounded at the end surfaces thereof and which are rigidly connected together. At said end surfaces there are provided holes for receiving a pivot pin in the middle of the rounded, semi-circular ends, and two elongate holes which extend peripherally of the semi-circular ends. An abutment pin is arranged to engage in each of the elongate holes to restrict the pivoting angle of two adjacent links to a pre-determined angular value. The elongate plates may have a saucer-like configuration at one end thereof and a fork-like configuration at the other end thereof, said fork being arranged to receive one end of an adjacent link.

When the links are constructed in the aforedescribed manner, the supporting means may be provided with a relatively large free-supporting length, although it should be noted that the forces acting on the links and stop means applied to said links are extremely high, said forces being particularly great when the free-supporting length is considerable and the flexible energy-transferring lines are heavy. By way of summary, it can be noted that each chain loaded with pre-calculated lines obtains a restricted free-supporting length.

To eliminate this disadvantage, it has been proposed to arrange along the parallel, co-extending length of the supporting means a supporting rail or frame along which a supporting carriage is intended to run. The supporting rail extends along the whole of the movement path of the consuming station, and, in the majority of cases, is connected with the movable consumer station by means of a belt or a line which extends over a roller mounted at one end of the rail.

Other constructions have also been proposed, in an attempt to satisfy the aforementioned requirement of a long, free-supporting length.

In order to obtain practically, infinitely long movement paths of said consumer station without increasing the space therefor, it has been proposed that the upper links of the chain, when said chain is bent back along its self, are moved along the lower links, said lower links serving as a support means. The disadvantage with this construction, however, is that the upper and lower links become unavoidably interlocked, which among other things results in excessive wear on the links.

OBJECTS OF THE PRESENT INVENTION.

The object of the present invention is to provide a chain construction where the upper links of the chain are supported by the lower links when, as the chain is turned back along its length, lower links are present, and that said upper links are supported on a base surface in the absence of lower links. Because the chain according to the present invention need not be constructed for long self-supporting chain lengths, said chain and said links can be made weaker than with prior art chain constructions of the type envisaged, which results in a less expensive chain construction.

Even though the technical and the economic advantages afforded by the present invention are greater in the case of energy-transferring lines of relatively long length, it will readily understood that these advantages can also be obtained with shorter lines.

The object of the present invention is realized with a chain construction of the aforedescribed type by the fact that a support surface is provided for each link, and that said support surfaces are mutually arranged to form one and the same plane when the holding device is oriented in one and the same plane, and by the fact that support wheels are provided at pre-determined links, the peripheral surface of respective wheels being arranged to extend over adjacent supporting surfaces.

BRIEF DESCRIPTION OF THE ATTACHED DRAWINGS.

So that the invention will be more readily understood and further featured thereof made apparent, an embodiment of the invention will now be described with reference to the accompanying drawings, in which FIG. 1 shows a chain construction having a number of holder means arranged between respective links and intended to support a flexible energy-transferring lines, FIG. 2 is a horizontal view, in somewhat larger scale with respect to FIG. 1, of four links in the chain construction shown in FIG. 1, FIG. 3 is a cross-sectional view, somewhat enlarged with respect to FIG. 1, of an upper link resting on a lower link, FIG. 4 shows in somewhat larger scale than in FIG. 1 the manner in which the direction in which the chain arrangement extends is changed, FIG. 5 is a sectional view taken along the line B—B in FIG. 4 and shows a support wheel and its method of attachment to a link, FIG. 6 is a sectional view taken through the line C—C in FIG. 4 and shows a support surface and its method of attachment to the link, FIGS. 7 and 8 are two projectional views of the support surface shown in FIG. 6, FIGS. 9 and 10 are two projectional views of the support surface, which surface is intended to be arranged adjacent the support wheel shown in FIG. 5, FIGS. 11 and 12 are showing two alternative chain arrangement according to FIG. 2, and FIGS. 14a–14d are different views of the construction of the support surfaces.

DESCRIPTION OF PREFERRED EMBODIMENTS.

Figure 1:
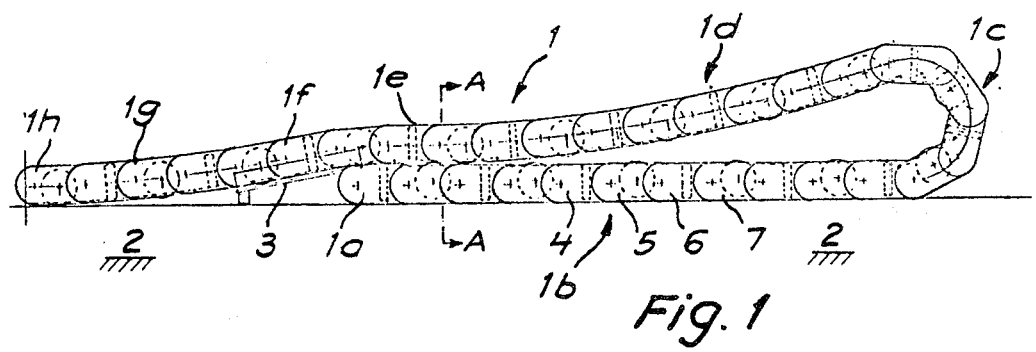

In FIG. 1 there is shown a side view of a chain arrangement 1 having a plurality of links for supporting and guiding one or more flexible energy-transferring lines, only part of a line being shown in FIG. 1, for the sake of clarity. The lines are intended to be attached at 1a in FIG. 1 to a connecting point (not shown) and the first link in the chain 1 is also intended to be connected to said connecting point. The lines are arranged centrally in the chain arrangement (along the bending axes of the links). Both the lines and the chain arrangement are shown in FIG. 1 in a position in which a first portion 1b of the chain rests on a base surface 2, a second chain portion 1c forms a curved chain portion as said chain is bent to extend in another direction, a third chain portion 1d forms a concave bend, so that the links in the upper part of the chain are able to abut the chain portions 1a and 1b respectively, a fourth chain portion 1e, in which portion said upper links lie against the links in the lower, first portion 1b, a fifth chain portion 1f which extends along a guide rail 3, and a sixth chain portion 1g which forms a concave bend so that the links of the chain can abut the base surface 2. The chain portion 1h shown in FIG. 1 may be attached to an energy-consuming or energy-producing apparatus (not shown) capable of moving in the longitudinal direction of the line and the chain arrangement. The manner in which the said apparatus is moved in the longitudinal direction of the chain arrangement does not form part of the present invention and is not shown or described.

The chain arrangement 1 comprises a plurality of pairs of adjacently arranged, inter-connected links 4, 5, 6, 7. As will be understood, any numer of such links may be connected together to form the chain arrangement. Since all the links incorporated in the chain arrangement are identical, only links 4, 5, 6 and 7 will be described. As will be seen from FIG. 2, the link 4 is connected and maintained in spaced parallel relationship to a link 4b via means such as a holder device 4a for supporting or holding the flexible energy-transferring lines. In a similar manner, the link 6 is connected with a link 6b via a holder device 6a. The links 4 and 4b and 6 and 6b are joined together by means of links 5 and 5b. Thus, with the illustrated embodiment there are provided pairs of links in parallel, namely links 4, 5, 6 and 7 and links 4b, 5b, 6b and 7b, i.e., links 4 and 4b are one pair, 5 and 5b a second pair, 6 and 6b a third pair, 7 and 7b a fourth pair, etc., throughout the length of the chain. Each pair of links functions as a single link in the chain and is comprised of the parallel laterally spaced opposing plates 4 and 4b, 5 and 5b, etc., respectively, which are maintained in parallel spaced relationship throughout the length of the chain by the connecting and spacing means 4a, 6a, etc.

With respect to the mutual co-action between the respective links, the structural design thereof may be varied without departing from the concept of the invention. By way of example it is assumed in the illustrated embodiment that the links are capable of being pivoted relative to each other through a pre-determined angle. The links, such as link 4 for example, comprise two identical plates which are rounded at the end surfaces thereof, which has offset ends 4c and 4d and which are rigidly connected together at the other ends 4e, each of said links having at 4e holes for receiving a centrally positioned pivot pin in the centre of semi-circular ends, and two elongate holes which extend peripherally of the semi-circular ends. An abutment pin is secured to the portions 5d and 5c and extends through respective ones of the elongate holes to limit the pivot movement of two adjacent links 4, 5 and 4b, 5b respectively. The plates may be saucer-shaped at one end 4e thereof and fork-shaped at the other end thereof, 4c, 4d, said fork-shaped ends being arranged to accommodate the saucer-shaped ends of adjacent links and the be hingedly interconnected thereto by said pivot pins. The constructional design of the links is more clearly described in Swedish Pat. Specification No. 321 835.

Figure 3:
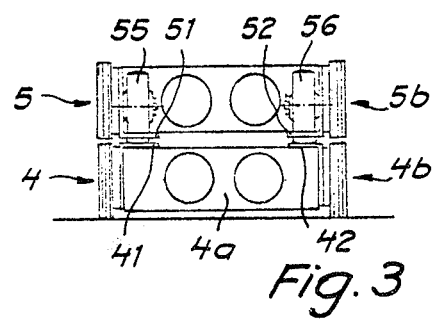

With the chain construction of the present invention a support surface is arranged adjacent each link, the support surface for the link 4 being shown by reference 41, the support surface for link 4b by the reference 42, the support surface for link 5 by the reference 51 and the support surface for link 4b by the reference 52. The support surface 41 is identical with the support surface 42 and the support surface 51 is identical with the support surface 52. Similarly, the links 6 and 6b are each provided with respective support surfaces 61 and 62, while links 7 and 7b have support surfaces 71 and 72. All the aforementioned support surfaces 41, 51, 61 and 71 etc. are arranged adjacent each link and are mutually positioned so that they lie in one and the same plane when the holder means 4a, 6a lie in one and the same plane and, as seen in FIGS. 3 and 5, this plane is substantially at the same level as the adjacent link plates. This applies for the chain lengths 1b, 1e, 1f in FIG. 1.

Adjacent pre-determined ones of said links, for example the links 5, 5b, 7, 7b are provided support wheels 55, 56 and 75, 76 respectively which extend via their respective peripheral surfaces slightly over adjacent support plates 51, 52 and 71, 72 respectively.

The construction of the support surfaces and their arrangement relative to the links, together with the arrangement of the support wheels relative to said links, will be more clearly described hereinafter with reference to FIGS. 5, 6, 7, 8, 9 and 10.

It should be mentioned here that if a link, similar to link 5, 5b which has rollers 55, 56 mounted thereon is located above a link similar to link 4, 4b which has no rollers, as illustrated in FIG. 3, and which may form part of the chain portion 1e of FIG. 1, the support wheels 55 and 56, respectively, will abut the support surface 41 and 42 respectively when they are at about the same level as the adjacent edges of their respective links, thereby ensuring that the link portions 4, 5 and 4b, 5b respectively will not come into mechanical sliding contact with each other. By means of a guide rail 3 the links are permitted to roll from the chain portion 1f onto the base surface 2 when the energy-consuming apparatus connected to 1h moves further to the left as seen in FIG. 1.

If it is now assumed that the energy-consuming apparatus is moved to the left in FIG. 1 to such an extent that the links 4, 5, 6 and 7 reach the curved portion 1c, their respective support surfaces 41, 51, 61 and 71, which are secured to each respective links, obtain the mutual orientation seen in FIG. 4, as do also the support surfaces 42, 52, 62 and 72 which are secured to the other links of each pair, viz. 4b, 5b, 6b and 7b, respectively, each of which is in the same plane as the support surface secured to its mate link.

The construction of the support surfaces will be described with reference to FIGS. 7 – 10. As will be seen from FIGS. 7 and 8, the support surface 41 comprises a loading surface 410 which merges at 411 with a support portion 412. The support portion 412 is provided with two holes 413, 414 by means of which the loading surface 410 can be held.

The loading surface 410 comprises a short portion 415, which is intended to face the support portion 412, and a longer portion 416.

The width of the shorter portin 415, i.e. the distance from an edge 417 to said surface 411, is slightly greater than the width $a$ of the longer portion 416. The edge 417 together with an edge 418 joins the two portions and forms spaces 419 and 420 respectively.

In the embodiment of FIGS. 9 and 10, the support surface 51 comprises a loading surface 510, which merges at 511 with a support portion 512. The support portion 512 is provided with three holes 513, 513a and 514, the holes 513 and 514 being intended for securing the loading surface 510.

The loading surface 510 comprises a long portion 515 facing the support portion 512 and a shorter portion 516. The width of the long portion 515 slightly exceeds the width $b$ of the shorter portion 51c, as seen in FIG. 10. An edge 51c, 518 as seen in FIG. 10, joins the two portions and forms spaces 519, 520. In the loading surface 51a is provided a recess 521, through which the peripheral surface of a support wheel can extend. The recess 521 extends slightly over the short portion 515 from the long portion 516.

Figure 2:
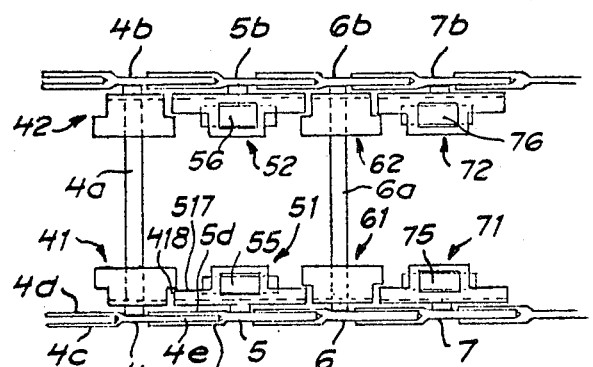

With reference to FIG. 2, it shall now be assumed that the edge surface 418 in FIG. 8 is arranged parallel with the edge surface 517, of FIG. 10, by location of the portion 515 in the space 420. In a similar manner, the space 520 accommodates the portion 416 on the support surface 41, and so on. The peripheral surface of a wheel 55 will constantly engage a support surface, even at the joint between two links 5, 6. This is illustrated in FIG. 1 along the chain length 1e.

FIG. 4 shows how the support surface 51 extends beyond the support surface 61 of the link 6 and thus, as a result of the link structure shown in FIG. 2, the support surfaces will pass free from each other, even when the radius of curvature at the chain curve 1c is relatively large.

FIG. 5 illustrates a manner of securing a support wheel 55 to the link 5, via a shaft 550. At its portion 512, the support surface 51 is securely connected to the link 5 by means of screw devices 513', 514', accommodated in said holes 513, 514, and the peripheral surface of the wheel 55 is arranged to extend through a distance of 2 – 5 mm over the load surface 510. The form of the recess 521 shall be commensurate with that of the wheels 55.

With the embodiment illustrated in FIG. 6, the support surface 41 comprises a loading surface 410 and an angled portion 412. The angled portion is secured between a holder device 4a and the link 4 by means of screw devices 413', 414', which extend through holes 413, 414. The holder means 4 is provided with holes 4a', which are intended to accommodate lines and the like.

As will be understood from the foregoing, the links 4, 5, 6 and 7 when in abutment with the base surface 2 in FIG. 1, or the base surface 2 itself, comprise, when supplemented. with the support surfaces, a support frame structure for the links, against which structure the weight of the links and the lines can be taken up, thereby enabling the path through which the consuming station or the energy-producing station moves to have practically unlimited length. As will be perceived from the aforegoing, the present invention obviates the need for fixed support rails or support frame structures, such fixed devices comprising an obstacle to transport paths on the surface of the floor used.

When the links of the chain portion 1b in FIG. 1 rest against the base surface 2, the support surfaces face upwardly, as do also the support wheels. When the links are moved over one another, said links will be spaced apart, owing to the support wheels. Each support wheel will roll over the support surfaces through at least a part of a revolution. The peripheral surfaces of the support wheels will support against each other. It is therefore important that the peripheral surfaces of the wheels do not extend excessively beyond adjacent support surfaces, since otherwise an irregular movement will result. In order to decrease irregularity of movement, the radius of the support wheels shall be relatively large with respect to the height of the links, and the extent to which the peripheral surface of the wheels extend beyond an adjacent support surface shall be restricted, for example to within 2 – 5 mm.

As previously mentioned, although the invention enables the energy-consuming and energy-producing station to be moved through relatively long distances unsupported, it will readily be perceived that the invention can also be applied to advantage with movement paths of shorter lengths.

Neither is the invention restricted to the aforedescribed embodiments, but can be modified within the scope of the accompanying Claims. For example, although the support surfaces 41, 51, 61, 71 and 42, 52, 62, 72 have been described as being placed between the links in the chain arrangement, the support surfaces may also be placed on the outer side of the links, when the chain arrangement is encapsulated.

Furthermore, three, four or more parallel extending linkstrips may be used instead of the pairs of links 4, 4b, 5, 5b, etc. described above. Also, the single chain arrangement extending from the connecting point to the consumer point can be replaced with two counter-moving chain arrangements if desired, for example when the energy requirements are high.

The angle of rotation between adjacent links is selected to enable links in the overlying portion of a bent-back chain to rest against underlying links or the base surface, where the free-supporting distance is chosen with the range of 5 – 15 links.

The requirements placed on the support surfaces in accordance with the invention is that said surfaces shall be capable of a change in the direction of movement of the chain and that they are able to form a planar running surface.

The support surfaces 51, and 41 as shown in FIGS. 5 and 6, are securely connected to respective links 5 and 4 via distance means 530 and 430. The distance means are provided to enable the portions 412, 512 to pass free from shafts and holder devices arranged between adjacent links, to produce the pivoting or rotating movement.

To facilitate the technical function of the chain arrangement, the support wheels should have a width which enables at least a part of the peripheral surface thereof to abut the support surfaces and to roll over said surface, even upon maximal lateral movement of the chain within the tolerance range. This, in turn, requires the support wheels and support surfaces to be so constructed that said wheels move smoothly, even when they bear against the side surfaces or base surface. The support surfaces form a continuous path for the support wheels owing to the fact that the gap formed between the mutually facing surfaces of the support surfaces has the form of a Z.

With the exemplary embodiment, support wheels have been shown placed on pairs of the same links. There is nothing to prevent the support wheels being placed on each alternate link, or each third link etc. The support wheels may also be placed diagonally, in accordance with the aforedescribed. It should be noted in this connection that a support surface applied to a link should be given an extension such that it extends beyond an adjacent link, and the configuration of the support surface may be substantially similar to that corresponding to the combination of the support surface 41 and 51 without an intermediate gap. This applies that the support surfaces for two adjacent links are formed as one unit and are attached to only one link. Even in this case, each link is allotted a support surface.

Figure 11:
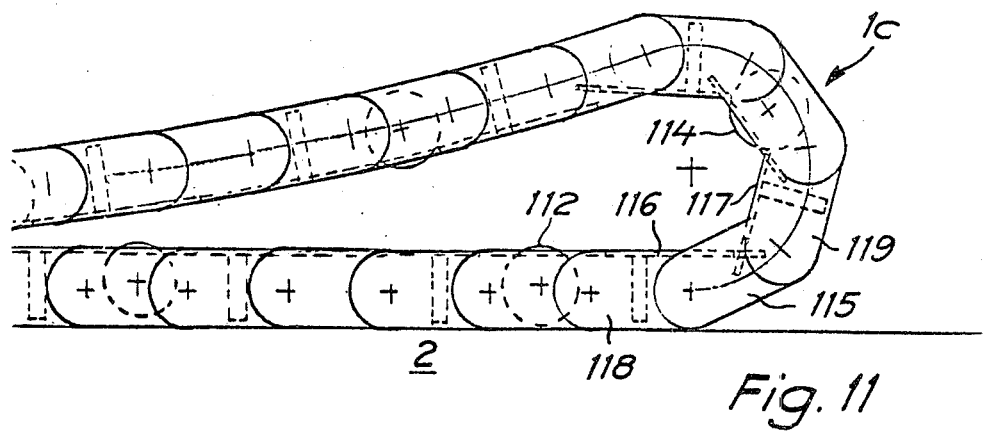
Figure 12:
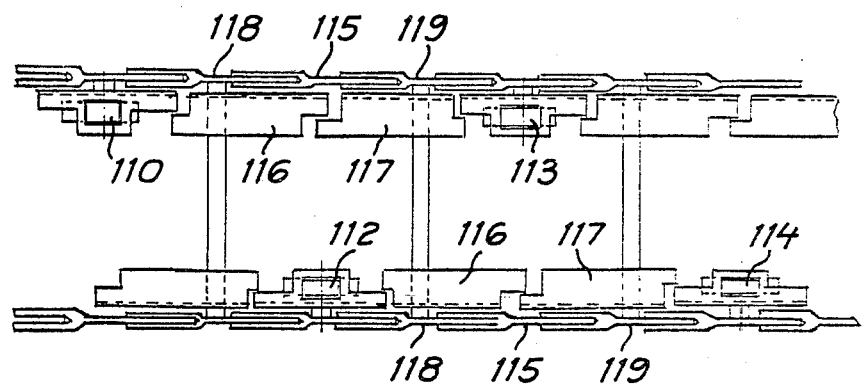
Figure 14A:
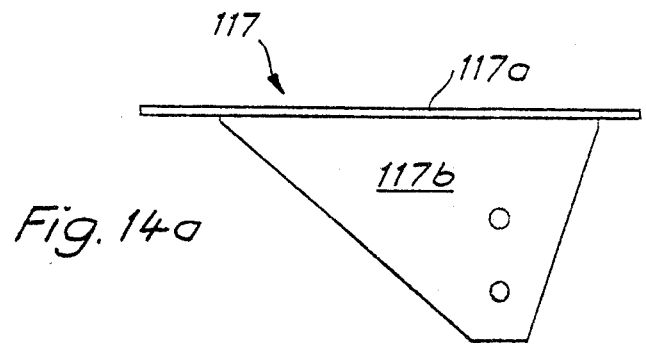
Figure 14B:
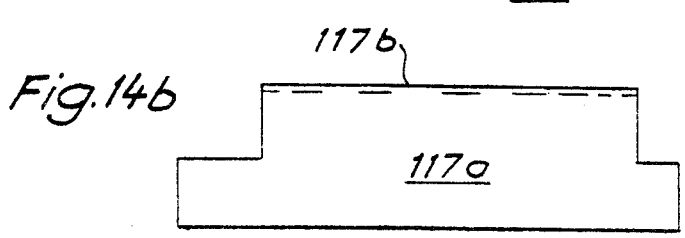
Figure 14C:
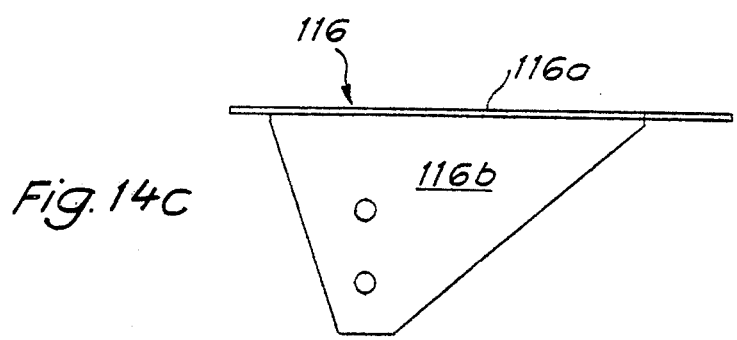
Figure 14D:
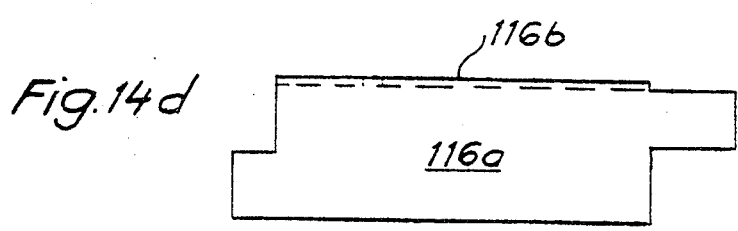

FIGS. 11 and 12 show two alternative chain arrangements with which each alternate diagonally located link is provided with a support wheel, the support wheels 110, 113 being arranged on one chain and the support wheels 112 and 114 being located on the other chain. This means that the link 115 opposite the wheel 112 has no support surface connected thereto. The support surface 116, 117 of adjacent links 118 and 119 respectively extend, however, over the link 115, thereby providing said link with a support surface. The support surface 117 is shown in FIGS. 14a and 14b, while the support surface 116 is shown in FIGS. 14c and 14d. In these latter Figures, the loading surface is identified by reference 118a and 116a, while the support portion is identified by reference 118b and 116b, said support surface being provided with suitable attachment holes. The mutually facing surfaces also have the form of a Z, for the reason previously mentioned. The arrangement of links 118, 115 and 119 is repeated periodically along the chain construction. Comparison should be made in this respect to the chain arrangement shown in FIG. 1, i.e. the chain curvature 1c. The support wheels 112, 114 etc. are surrounded by support surfaces according to FIG. 9 and 10.

Figure 13:
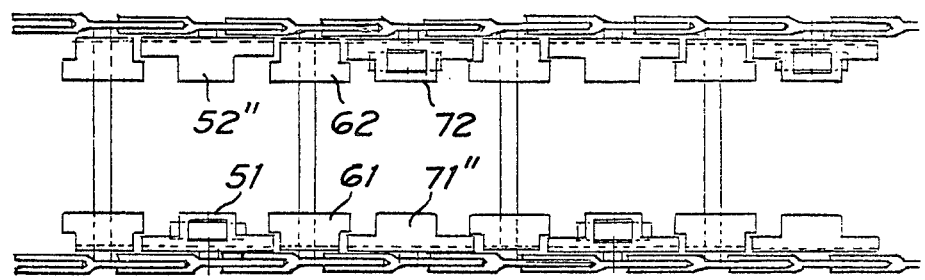

FIG. 13 shows an alternative embodiment where each alternate support surface 52″, 71″ is wholly formed and lacks support wheels. Thus, with this alternative embodiment the recess 521 shown in FIG. 10 is omitted.

A common feature of the embodiments shown in FIG. 11, 12, 13 is that all the support surfaces form one plane with a flat chain arrangement, and that curvature of the chain, at 1c, can take place without interruption.

I claim:

1. A chain construction adapted to support and guide at least one flexible energy-transferring line and to be attached at one end thereof to a connecting point and at its other end to an energy-consuming or energy-producing apparatus capable of moving in the longitudinal direction of the said line, a plurality of links comprising pairs of spaced link plates with adjacent link plates joined together in a manner such that said links can pivot through a predetermined angle, a support surface for each link plate at about the level of an edge thereof, said surfaces being mounted on at least some of the links so as to lie in one and the same plane, and support wheels rotatably mounted on predetermined links with the peripheral surface of each wheel extending slightly above the support surface adjacent to the mounting.

2. A chain construction according to claim 1, wherein the adjacent ends of support surfaces are provided respectively with a recess and an extension, said extension of the support surface of a link being arranged to extend loosely into the recess of the support surface of the adjacent link.

3. A chain construction according to claim 2, wherein the ends of adjacent support surfaces are arranged to extend towards each other in a manner such that they pass free from each other upon curvature of the chain.

4. A chain construction according to claim 1 wherein the peripheral surfaces of the support wheels are located in recesses in adjacent support surfaces.

5. A chain construction according to claim 1, wherein a support wheel is arranged on each alternate link.

6. A chain construction according to claim 5, wherein alternate pairs of link plates are held in spaced relation by holder devices for flexible energy-transferrng lines and a support wheel is mounted between adjacent holder devices.

7. A chain construction according to claim 6, wherein support surfaces attached to links held in spaced relation by holder devices extend over and supply a support surface for an intermediate link.

8. A chain construction according to claim 1, wherein the angle of rotation between adjacent links is such that said links are able to rest against underlying links or a base surface through a self-bearing distance of approximately 5 – 15 links.

9. A chain construction according to claim 1, wherein the support surfaces are placed between links.

10. A chain construction according to claim 9, wherein the links are parallel.

11. A chain construction according to claim 1, wherein a second chain construction as defined in claim 1 is adapted to be attached at one end to said connecting point in countermoving relation to the first chain construction.

12. A chain construction according to claim 1, wherein the wheels are arranged diagonally in adjacent links.

13. A chain construction according to claim 1, wherein respective support wheels have a width which ensures that at least part of the peripheral surface of said wheels engages the support surfaces to roll upon said surface even when the chain moves laterally to a maximum extent within an allotted horizontal tolerance range.

14. A chain construction according to claim 1, wherein the support surfaces form a continuous path for the support wheels.

15. A chain construction according to claim 1, wherein the support surfaces for two adjacent links are formed as a single unit and are attached to one link.

16. A chain construction according to claim 1, wherein the portion of the periphery of each of the respective wheels adjacent to the support surface is enclosed by the support surface.

17. A chain construction according to claim 1, wherein the predetermined angle through which adjacent links can pivot permits the chain to form a curved portion through a self bearing distance of about 5 to 15 links as the chain is bent to extend in the reverse direction and bring support wheels on links in an upper section of the chain into engagement with suppport surfaces on links in an under section of the chain.

18. A chain construction according to claim 17 in which said predetermined angle also permits the chain to form concave curved portions permitting the links in the upper section to abut the links in the under section and a base surface beyond said connecting point upon which the under section lies.

19. A chain construction comprising a plurality of consecutively joined links, each link comprising at least two parallel laterally spaced opposing plates, adjoining plates of consecutive links being interconnected by hinge means, means to maintain said opposing plates in parallel spaced relationship throughout the length of said chain, said means to maintain said opposing plates in parallel spaced relationship also being adapted to serve as holder means for supporting and guiding at least one flexible energy-transferring line, said chain construction being adapted to be attached to an energy-consuming or energy-producing apparatus capable of moving in the longitudinal direction of the chain, adjacent links in the chain being joined together in a manner such that said links can ppivot through a pre-determined angle, characterized in that:

a. each link is provided with an upper support surface, said surfaces being mutually arranged to lie in one and the same plane when the holder means are oriented in one and the same plane, b. pre-determined links are provided with support wheels, c. the peripheral surfaces of said wheels are extending above adjacent support surfaces, d. the angle of pivotation between adjacent links is such that said links are able to rest against underlying links or a base surface through a self-bearing distance of approximately 1-15 links, and the support wheels are arranged to coact with upper support surfaces or a base surface.

* * * * *